3,183,170
METHOD OF L-AMINO ACID MANUFACTURE
Atsuo Kitai, Tokyo, Iwao Kitamura, Kitaku, Yokohama, and Noboru Miyachi and Asaichiro Ozaki, Tokyo, Japan, assignors to Sanraku Ocean Kabushiki Kaisha
No Drawing. Filed Aug. 20, 1962, Ser. No. 218,129
Claims priority, application Japan, Oct. 3, 1961, 36/35,342
9 Claims. (Cl. 195—30)

The present invention consists of a transamination reaction for the production of an L-amino acid and is unique in that the L-glutamic acid used as the amino group donor is resynthesized and recycled in a continuous process. The general process of transamination may be represented as follows:

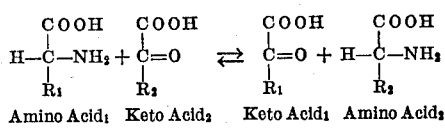

Amino Acid₁  Keto Acid₂    Keto Acid₁  Amino Acid₂

The process represents an intermolecular transfer of amino groups without splitting out of ammonia. The reaction is reversible and is catalyzed by transaminase. Transaminase has been found in practically all animal tissue (but especially in heart, brain, kidney, testicle and liver), in higher plants and in microorganisms. The transaminase requires pyridoxal phosphate or pyridoxamine phosphate as cofactor.

The object of this invention is to offer a method for an industrially profitable manufacture of L-amino acid through glutamic acid by execution of L-glutamic acid formation and transamination in such manner that the substrate may be conjugative.

The conventional methods for the biochemical industrial production of L-amino acids involve either direct fermentation of metabolizable substances, such as sugar, or transamination reactions. The major disadvantage of the latter is that the reaction stops when chemical equilibrium is obtained, thereby limiting the yield of the desired product. In order to increase the yield it is necessary to shift the equilibrium to the right. This has been accomplished in the conventional methods by increasing the concentration of the starting materials, namely the amino group donors. Another method of shifting the equilibrium is to eliminate one of the reaction products as fast as it is formed. This is a well known principle of equilibrium shift but the method is so complicated that it has never been seriously attempted industrially.

However, the present inventors have been successful in our research efforts to shift the equilibrium favorably to the right by the elimination of one of the reaction products. The α-keto glutaric acid resulting from the transamination reaction is converted back to L-glutamic acid as fast as it is formed by *reductive amination*. This not only shifts the equilibrium thereby increasing the yield but regenerated the amino group donor which is used over and over again. Consequently, a small amount of L-glutamic acid can be used to produce a considerable amount of new L-amino acids in a continuous process, simply by the addition of the desired keto acids and ammonium source to the reaction vessel.

It is known that $NH_3$ administered to animals is rapidly incorporated in most of the amino acids of proteins, and it appears that this incorporation first involves glutamic acid formation by the reaction of $NH_3$ with α-keto-glutaric acid, followed by transamination reactions of glutamic acid with the keto acids corresponding to the various amino acids. The present inventors have used this principle.

This invention discloses a process whereby the α-ketoglutaric acid is continuously reduced to L-glutamic acid in the presence of a multi enzyme system, hydrogen gas, and a nitrogen source, such as inorganic ammonium salt, organic ammonium salt, ammonium hydroxide, ammonia gas, or urea.

This implies that the formation product, i.e., α-ketoglutaric acid has been eliminated from the formation system and it has been converted into L-glutamic acid as a reaction substance in the reaction system; accordingly the equilibrium is shifted in a direction favorable for L-amino acid formation, thus making it possible to maintain the reaction until most of the keto acid used as a reaction substance is transformed into L-amino acid. In this process, L-glutamic acid, releasing an amino-group, turns into α-ketoglutaric acid, which further assimilates under presence of the said multienzyme system and hydrogen gas, nitrogen source, for instance, inorganic ammonium salt, organic ammonium salt, ammonium hydroxide, ammonia gas, or urea and becomes L-glutamic acid to be recirculated in the reaction system. In consequence, an exceedingly small addition of L-glutamic acid as a reaction component as compared with the concentration of keto acid to be changed into L-amino acid will suffice; and since its function is supposed to be merely as a carrier of amino nitrogen, apparently it looks as if an inorganic ammonium ion were directly making reductive amination of keto acid.

In brief, the process of transamination of this invention may be represented as follows:

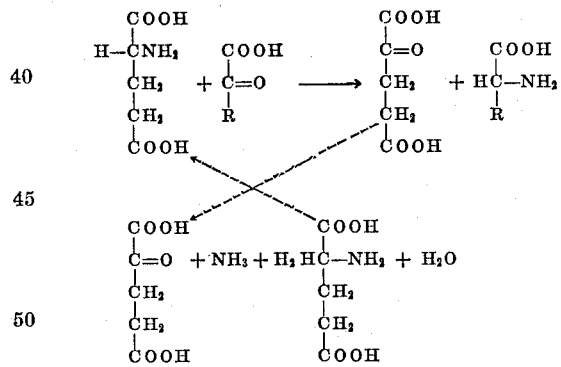

If a comparable yield of keto acid to the present invention were to be secured by the conventional method of transamination, experimental examples show that about 20 times more L-glutamic acid would be required and the residual amount of L-glutamic acid after reaction would be large. Moreover, a gaseous substance like hydrogen gas being employed under this invention, the gas can be retained under pressure or blown into the reaction vessel and made to participate in the reaction at high concentration; thereby not only the equilibrium is shifted more in favor of the formation system but also L-amino acid can be stored in the reaction liquid at an extremely high concentration. Thus, a small addition of L-glutamic acid can react with keto acid of very high concentration and assure transamination and accordingly it will also be possible to form a considerable amount of L-amino acid through continuous addition of small amount of L-amino acid-transformable keto acid, i.e., nitrogen source, to the reaction vessel. Thereby the yield per material keto acid and L-glutamic acid will be incomparably larger than that in simple transamination.

These facts are experimentally illustrated as follows:

activated by hydrogenase are used methyl viologen, benzyl viologen, Janus green, etc.

The multi-enzyme system, consisting of dehydrogenase, hydrogenase, transaminase, hydrogen acceptors and electron transport system, is obtained from various sources. It has been well established that the major part of biological and plant oxidation and reduction involves a succession of oxidation-reduction systems arranged as an integrated chain in the cell mitrochondria. A metabolite activated

EXAMPLE

|  |  | Before reaction | | After reaction | | L-phenyl alanine, Phenyl pyruvic acid, percent | L-phenyl alanine, L-glutamic acid, percent |
| --- | --- | --- | --- | --- | --- | --- | --- |
|  |  | Phenyl pyruvic acid g. | L-glutamic acid g. | L-phenyl alanine, g. | L-glutamic, g. | | |
| Present invention | A-1 | 1.60 | 0.28 | 1.47 | 0.26 | 92 | 525 |
|  | A-2 | 2.40 | 0.28 | 2.06 | 0.25 | 86 | 734 |
| Simple transamination | B-3 | 1.60 | 0.28 | 0.30 | 0.02 | 18.7 | 107 |
|  | B-4 | 1.60 | 5.0 | 1.32 | 3.66 | 79.5 | 26.4 |

REACTING CONDITIONS (A)

Extract of anaerobic cultured cells of Escherichia coli KB–50 _____ml__ 2
Brevibacterium saccharolyticum No. 7636 cells (in terms of dried cells)_____mg__ 500
Extract of Serratia marsescens KB–60 cells ____ml__ 3
Ammonium chloride _____g__ 1.2
Methyl viologen (violet) _____mg__ 10
Phosphate buffer M/10, pH 7.6 _____ml__ 20
Hydrogen gas bubbling 30° C., 8 hrs.

(B)

No hydrogen gas bubbling with the reaction composition the same as above.

In this invention any of the following may be used as hydrogenase; anaerobic cultured cells, their macevates, cell extracts or refined extracts of *Escherichia coli, Desulfovibrio desulfuricans, Proteus vulgaris, Hydrogenmonas facilis, Azotobacter vinelandii* and Clostridium species such as *Cl. pasteurianum, Cl. kluyveri, Cl. welchii, Cl. butylicum, Cl. acetobutylicum*.

To illustrate a few concrete examples, *E. coli* is cultivated anaerobically for 18 hours in a culture medium of pH 7.0 containing glucose, peptone and beef extract; the cells are collected by centrifugation, washed and then treated with a sonic cacillator (10 kc.). The obtained sonicates may be used as enzyme solution, but they are further separated centrifugally and the supernatant liquid is treated with manganese chloride. With the precipitate being removed, it can be employed as a refined enzyme solution.

*Desulfovibrio desulfuricans* is anaerobically cultivated at 30° C. in a culture medium of pH 7.0 containing glucose, peptone and $SO_4^{--}$ ions, the cells are centrifugally separated from the culture, washed and then disrupted by a sonic oscillator (10 kc.) and the sonicates are employed as crude enzyme solution. Or these cells are made into acetone dried cells, which are extracted in a dilute buffer solution to separate the cells. Then the separated cells are heat-treated at 60° C. for 10 minutes and further deprived of nucleic acid by protamine sulfate; the obtained product is utilized as refined enzyme.

In the case of *Clostridium acetobutylicum*, its spore is inoculated in the Speakmann culture medium for anaerobic cultivation for 2 days at 37° C.; the culture is centrifugally separated to collect the cells, which are sonicated to obtain an enzyme solution.

As the acceptor of the hydrogen which has been by its specific dehydrogenase is at one end of the chain and molecular oxygen at the other end. In between is a succession of hydrogen and electron acceptors or carriers, namely the diphosphopyridine nucleotide system, which acts as coenzyme with specific dehydrogenase, the triphosphopyridine nucleotide system, the flavoprotein enzyme system, the cytochrome system and the coenzyme Q system. The L-glutamic acid dehydrogenase refers to all the biological substances with such metabolic ability; including the following: cultures on a glucose-base medium of such microbes as *Escherichia coli*, beer yeast, *Brevibacterium lactofermentum*, Micrococcus; their cells or dried cells; animal tissue such as cow's liver, frog's muscle, chicken's liver; vegetable tissue such as mitochondria of peas, wheat leaf, leaf of young corn and their preparations such as extracts of their grindings in a buffer solution, refined enzyme solution or enzyme preparation as obtained through ammonium sulfate fractionation, nucleic acid elimination, or refined crystallized enzyme.

On the other hand, transaminase refers to all the biological substances that can perform transamination, including: cultures on a glucose-base medium, cells, and dried cells, of such microbes as *Escherichia coli, Serratia marsescens, Bacillus dysenteriae*, Azotobacter, *Neurospora crassa*; animal tissue such as rabbit's muscle, pig's heart, rat's liver; vegetable tissue such as the seeds of lupine, barley, wheat; and preparations from these such as extracts of cell macerates in aqueous solution, enzyme solution, enzyme preparation.

Further, the following are available as transaminases; for instance, glutamic-alanine, glutamic-aspartic acid, glutamic-valine, glutamic-leucine, glutamic-isoleucine, glutamic-norleucine, glutamic-tyrosine, glutamic-phenylalanine, glutamic-tryptophan, glutamic-methionine, glutamic-threonine, glutamic-lysine, glutamic-cystine, glutamic-glycine, glutamic-γ-aminobutyric acid, glutamic-citrulline, glutamic-ornithine, glutamic-methyltyrosine, glutamic-arginine, etc.

As the nitrogen source the following are recommendable; organic and inorganic ammonium salts such as ammonium acetate, ammonium citrate, ammonium oxalate, ammonium chloride, ammonium phosphate, ammonium nitrate; ammonia water, ammonia gas, urea, etc.

Moreover, it would sometimes contribute to increased yield if, for instance, diphosphopyridine nucleotide, triphosphopyridine nucleotide and their derivatives or substances containing them were added as cofactor to L-glutamic acid dehydrogenase; or metallic ions of, say, iron, manganese or copper as cofactors to hydrogenase and electron transport system; or pyridoxal phosphate, pyridoxine, pyridoxamine and their derivatives or substances containing them as cofactor to transaminases by way of helping to obtain smooth reaction.

Buffer, acid and alkali are used to maintain such pH value which is most suitable for preventing the reduction of keto acid to hydroxylic acid through reaction due to hydrogenation depending on the combination of enzymes used; such value is generally over 7.0. Also it is important that the most suitable reaction temperature should be maintained according to the combination of enzymes; such temperature exists generally in the range between 25° C. and 40° C.

The essence of this invention lies in high-yield, high-concentration storage, separation and refinement of L-amino acid through particiation of L-glutamic acid and hydrogen gas in the reaction process, recirculated use of the said glutamic acid, thereby L-glutamic acid formation reaction and transamination taking place with the substrate being utilized through L-glutamic acid conjugatively, under the presence of hydrogenase, hydrogen acceptor, electron transport system, L-glutamic acid dehydrogenase, transaminase, nitrogen source and L-amino acid-transformable keto acid. Explanation with reference to actual examples ensues.

Example 1

Into a 300 ml. capacity reaction vessel permitting gas exchange were added 4 ml. of extract from anaerobic cultured cells of *Escherichia coli* KB–50, 3 ml. of L-glutamic acid dehydrogenase solution prepared from cow's liver, 2.0 ml. of transaminase solution extracted from pig's heart muscle, 20γ of diphosphopyridine nucleotide, 10 mg. of methyl viologen, 0.34 g. of L-glutamic acid, 3.0 g. of α-ketoisovaleric acid and 4 g. of ammonium chloride and further 20 ml. of M/10 pH 7.2 phosphate buffer solution, totaling 100 ml. Then at 30° C., hydrogen gas from a cylinder was supplied into the reaction vessel for 24 hours, after which the vessel was heated to 100° C. for 10 minutes and the reaction was stopped. As the result L-valine in the solution reached 2.3 g., which was a 73% yield. After deproteinization, the solution was separated and refined using a strongly acidic cationic exchanger, say Dowex 50, to produce 2.0 g. of L-valine crude crystal.

Example 2

With the same composition of reaction liquid as in Example 1 used except that 2.7 g. of pyruvic acid was employed as keto acid and the pH value was made equal to 9.8 by means of veronal buffer, a reaction was made at 37° C. in presence of hydrogen gas. After 14 hours the amount of L-alanine reached 2.5 g. and therefrom 2.1 g. of L-alanine crude crystal could be obtained.

Example 3

With the same composition of reaction liquid as in Example 1 except that 4.0 g. of oxaloacetic acid was employed as keto acid, a reaction was conducted at 30° C. for 18 hours, while bubbling in exchanging hydrogen gas. As the result 3.1 g. of L-aspartic acid crude crystal could be obtained.

Example 4

*Proteus vulgaris* KB–72 cells, amounting to 0.5 g.; sonicate of *Brevibacterium lactofermentum* ATCC 13869, 0.5 g.; *Serratia marcescens* KB–60 cells, 0.5 g. were dissolved in methyl viologen 1.0 mg., L-glutamic acid 0.5 g. and β-hydroxy-α-ketobutyric acid 4.0 g., and 100 ml. of such solution was obtained. Ammonia water was added to the solution to make its pH value equal to 8.0. Hydrogen gas was introduced into the solution and an agitating reaction was made in the temperature range 30 to 35° C. with the internal pressure kept at 0.3 kg./cm.². The pH variation was controlled between 7.0 and 8.0 by addition of ammonia water. After a reaction time of 18 hours, L-threonine amounted to 3.3 g., from which through a strongly acidic cationic exchanger treatment 2.9 g. of L-threonine crude crystal was gained.

Example 5

α-Keto isocaproic acid being employed as keto acid and otherwise under the same procedure and conditions as in Example 4, a reaction was made and as the result, 3.5 g. of 2-keto isocaproic acid yielded 2.9 g. of L-leucine crude crystal.

Example 6 p-Oxyphenyl pyruvic acid 2.0 g. being employed as keto acid and otherwise under the same procedure and conditions as in Example 4, a reaction was maintained for 16 hours with hydrogen gas being passed. As the result, 1.6 g. of L-tyrosine crude crystal was acquired.

Example 7

Extract of *Escherichia coli* KB–50 being employed as transaminase instead of *Serratia marcescens* KB–60 and otherwise under the same conditions as in Example 4, 1.9 g. of L-tryptophan crude crystal was obtained from 2.2 g. of indole pyruvic acid.

Example 8

Under similar conditions to Example 4, first 0.5 g. of α-keto-γ-methiolbutyrate, and then 0.5 g. of it every two hours, totaling 3.0 g., was periodically added while adjusting the pH value by ammonia water. As the result, L-methionine amounting to 2.8 g. was obtained.

What is claimed is:
1. A method of manufacturing L-amino acid, which comprises reacting L-glutamic acid and a keto acid that is transformed into the amino acid in the presence of:
  (a) L-glutamic dehydrogenase,
  (b) hydrogenase, selected from at least one member of the group consisting of cells of microbes which are strongly active as hydrogenase and refined preparations and extracts thereof,
  (c) transaminase, selected from at least one member of the group consisting of microbes which are strongly active as transaminase, animal heart, kidney, liver and muscle, vegetable tissue and preparations obtained from said transaminase substances,
  (d) a dye which acts as a hydrogen acceptor selected from at least one member of the group consisting of methyl viologen, benzyl viologen, and Janus green,
  (e) electron transport system, selected from at least one member of the group consisting of cytochromes, flavin enzymes, dehydrogenase and the cofactors thereof,
  (f) hydrogen gas in concentration sufficient to cause the equilibrium to shift in favor of the formation of said L-amino acid, and
  (g) a compound acting as a nitrogen source, which is selected from the group consisting of organic ammonium salts, inorganic ammonium salts, ammonium hydroxide, ammonia gas and urea.
2. A method of manufacturing L-amino acid, as claimed in claim 1, wherein said hydrogenase comprises anaerobic cultured cells, selected from at least one member of the group consisting of *Escherichia coli*, *Desulfovibrio desulfricans*, *Proteus vulgaris*, *Hydrogenmonas facilis*, *Azotobacter vinelandii*, and a Clostridius species selected from at least one member of the group consisting of *Cl. pasteurisnum*, *Cl. acetobutylicum*, *Cl. kluyveri*, *Cl. welchii*, and *Cl. butylicum*.
3. A method of manufacturing L-amino acid, as claimed in claim 1, wherein said transaminase is selected from an extract of *Escherichia coli*, *Serratia marsescens*, *Azotobacter*, *Vinelandii* and *Neurospora crassa*.
4. A method of manufacturing L-amino acid as claimed in claim 1, wherein said transaminase is obtained from a material selected from at least one member of the group consisting of cells of microbes, the extracts thereof, animal kidney, heart, muscle, liver, plant seed and mitochondria.

5. A method of manufacturing L-amino acid, as claimed in claim 1, wherein said transaminase is employed in the presence of a cofactor of said transaminate, said cofactor containing at least one member of the group consisting of pyridoxal phosphate, pyridoxine, and pyridoxamine.

6. A method of manufacturing L-amino acid, as claimed in claim 1 wherein a cofactor of dehydrogenase is selected from the group consisting of diphospho pyridine nucleotide, triphospho pyridine nucleotide.

7. A method of manufacturing L-amino acid, as claimed in claim 1, wherein a cofactor to hydrogenase and an electron transport system is an ion selected from the following group, $Fe^{++}$, $Mn^{++}$, $Cu^{++}$ and $Fe^{+++}$.

8. A method of manufacturing L-amino acid, as claimed in claim 1, wherein aerobic cultured cells are added to the electron transport system as a supplement.

9. A method of manufacturing L-amino acid, as claimed in claim 1, wherein said keto acid is selected from the group consisting of α-keto-isovaleric acid, phenyl pyruvic acid, pyruvic acid, α-keto-β-oxybutyric acid, oxalocetic acid, α-keto-isocaproic acid, p-oxyphenyl pyruvic acid, indole pyruvic acid and α-keto-γ-methiolbutyrate.

References Cited by the Examiner
UNITED STATES PATENTS 2,749,279   6/56   Smythe et al. _____ 195—30

OTHER REFERENCES

Meister: Biochemistry of Amino Acids, pp. 165 and 175 to 179, Academic Press, Inc., New York (1958).

Kinoshita: Advances in Applied Microbiology, pp. 201 to 214 (p. 204 particularly relied upon), Academic Press, Inc., New York (1959).

Werkman et al.: Bacterial Physiology, pp. 517 to 530, Academic Press, Inc., New York 1951.

A. LOUIS MONACELL, *Primary Examiner.*

ABRAHAM H. WINKELSTEIN, *Examiner.*